US009656553B2

(12) United States Patent
Baumann et al.

(10) Patent No.: US 9,656,553 B2
(45) Date of Patent: May 23, 2017

(54) SWITCHING DEVICE FOR AN ELECTRICALLY DRIVEN VEHICLE, AND ELECTRIC VEHICLE

(71) Applicants: SIEMENS AKTIENGESELLSCHAFT, Munich (DE); RICHARD AG, Murgenthal (CH)

(72) Inventors: Thomas Baumann, Wuerzburg (DE); Dieter Hofer, Riken (CH)

(73) Assignees: Siemens Aktiengesellschaft, Munich (DE); Richard AG, Murgenthal (CH)

( * ) Notice: Subject to any disclaimer, the term of this patent is extended or adjusted under 35 U.S.C. 154(b) by 306 days.

(21) Appl. No.: 14/367,984

(22) PCT Filed: Dec. 5, 2012

(86) PCT No.: PCT/DE2012/200081
§ 371 (c)(1),
(2) Date: Jun. 23, 2014

(87) PCT Pub. No.: WO2013/091629
PCT Pub. Date: Jun. 27, 2013

(65) Prior Publication Data
US 2015/0014110 A1   Jan. 15, 2015

(30) Foreign Application Priority Data

Dec. 23, 2011  (DE) .......................... 10 2011 089 812

(51) Int. Cl.
*B60L 1/00*  (2006.01)
*B60L 3/00*  (2006.01)
(Continued)

(52) U.S. Cl.
CPC ................. *B60L 5/00* (2013.01); *B61C 17/00* (2013.01); *H01H 3/32* (2013.01); *H01H 9/02* (2013.01);
(Continued)

(58) Field of Classification Search
CPC ........ B61C 17/00; B60L 2200/26; B60L 5/00; H01H 2239/044; H01H 3/32; H01H 9/02
(Continued)

(56) References Cited

U.S. PATENT DOCUMENTS 5,020,441 A * 6/1991 Burg ....................... E01B 25/28
104/130.05
7,359,166 B2 * 4/2008 Skauen ..................... H02P 7/03
361/23
(Continued)

FOREIGN PATENT DOCUMENTS

DE        19620348 A1   10/1997
DE     102005008212 A1    8/2006
(Continued)

*Primary Examiner* — Jared Fureman
*Assistant Examiner* — Esayas Yeshaw
(74) *Attorney, Agent, or Firm* — Laurence A. Greenberg; Werner H. Stemer; Ralph E. Locher

(57) ABSTRACT

A switching device for an electrically driven vehicle, in particular a track vehicle, has a switch unit that is provided for respectively connecting and disconnecting a vehicle drive unit to and from an electrical supply line carrying high voltage and has at least two switch contacts. A drive unit is provided for driving a relative movement of the switch contacts with respect to one another. A housing unit receives the switch unit and the drive unit. The housing unit contains a support for supporting at least the switch unit. In order to provide a generic switch device for which a compact construction can be achieved, the switch unit is arranged in a lying position relative to the support.

18 Claims, 4 Drawing Sheets

(51) Int. Cl.
*H02G 3/00* (2006.01)
*B60L 5/00* (2006.01)
*B61C 17/00* (2006.01)
*H01H 3/32* (2006.01)
*H01H 9/02* (2006.01)

(52) U.S. Cl.
CPC .... *B60L 2200/26* (2013.01); *H01H 2239/044* (2013.01)

(58) Field of Classification Search
USPC .......................................................... 307/9.1
See application file for complete search history.

(56) References Cited

U.S. PATENT DOCUMENTS

| | | | |
|---|---|---|---|
| 8,716,884 | B2 | 5/2014 | Ikemoto et al. |
| 2005/0099037 | A1* | 5/2005 | Kitoh ..................... B60J 7/0573 296/223 |
| 2005/0146830 | A1* | 7/2005 | Green ..................... B60L 5/005 361/143 |
| 2006/0071862 | A1* | 4/2006 | Aisenbrey ................ H01B 1/22 343/700 MS |
| 2006/0096347 | A1* | 5/2006 | Sommerer ............. B61C 17/04 72/705 |
| 2009/0179718 | A1 | 7/2009 | Aubigny et al. |
| 2011/0094841 | A1* | 4/2011 | Mazumdar ................ B60L 7/10 191/33 R |
| 2011/0158778 | A1* | 6/2011 | Harrington .......... B65G 69/003 414/401 |
| 2011/0316333 | A1* | 12/2011 | Still ........................ B60L 1/003 307/9.1 |
| 2012/0169114 | A1* | 7/2012 | Andris ..................... B60K 6/46 307/9.1 |
| 2012/0205380 | A1* | 8/2012 | Rekasch ................ B61D 17/16 220/324 |
| 2013/0049843 | A1* | 2/2013 | Jorge ................... H03K 17/168 327/438 |
| 2013/0154711 | A1* | 6/2013 | Kuttenkuler ..... H03K 17/08128 327/326 |

FOREIGN PATENT DOCUMENTS

| | | |
|---|---|---|
| DE | 102006043632 A1 | 3/2008 |
| DE | 102008011522 A1 | 8/2009 |
| EP | 0801407 A2 | 10/1997 |
| EP | 2020332 A1 | 2/2009 |
| EP | 1996427 B1 | 6/2011 |
| RU | 2009101054 A | 7/2010 |
| RU | 2421841 C2 | 6/2011 |

* cited by examiner

SWITCHING DEVICE FOR AN ELECTRICALLY DRIVEN VEHICLE, AND ELECTRIC VEHICLE

BACKGROUND OF THE INVENTION

Field of the Invention

The invention relates to a switching device for an electrically driven vehicle, in particular a rail-borne vehicle, having a switching unit that is provided for connecting and disconnecting a vehicle drive unit to and accordingly from an electrical supply line that is conveying a high voltage and said switching unit comprises at least two switch contacts, having a drive unit that is provided for driving a relative movement of the switch contacts with respect to one another, and having a housing unit at least for receiving the switching unit and the drive unit, wherein the housing unit comprises a carrier for supporting at least the switching unit.

DE 10 2006 043 632 A1 discloses a switching device that is for use in a railway system and comprises a switching part, which comprises two switch contacts, and a drive system having a switch rod that moves a switch contact. The switching device is fastened to a fastening base plate on the roof of a rail-borne vehicle. The drive system is arranged—in relation to the vertical direction in the fastened state of the switching device—in a housing that protrudes below the fastening base plate into a roof aperture that is cut out of the roof. The switching part is arranged above the fastening base plate and is spaced apart from said fastening base plate by way of an air gap.

Moreover, it is known from EP 1 996 427 B1 to arrange the switching part together with the drive system in a housing. However, this document only proposes to accommodate a known switching system in a chamber that is encompassed by a housing, wherein the installation volume required by the switching system remains unchanged.

BRIEF SUMMARY OF INVENTION

The object of the invention is to provide a switching device in accordance with the generic type, wherein a compact construction can be achieved. In the case of an arrangement of a switching device on a vehicle roof element, it is intended in particular to achieve a flat as possible construction—in relation to the vertical direction.

It is proposed for this purpose that the switching unit is arranged relative to the carrier in a lying position on said carrier. As a consequence, it is possible to achieve a particularly compact construction. In the case of a horizontal—relative to the ground—arrangement of the carrier, it is possible by virtue of the lying position of the switching unit and the arrangement of said switching unit on the carrier to achieve a particularly flat construction, in particular a low installation height. In an advantageous manner, the switching unit comprises a housing that encompasses a chamber that is provided for the switch contacts and lies in a lying position on the carrier.

The carrier comprises in an expedient manner at least one carrier surface on which the switching unit is arranged. The switching unit is embodied in particular in an elongated manner and comprises a defined longitudinal direction. Said longitudinal direction can correspond in particular to a direction of movement in which during a switching procedure the switch contacts move in a relative linear manner with respect to one another. The reference to an arrangement of the switching unit "in a lying position relative to the carrier" is to be understood to mean in particular an arrangement in which the longitudinal direction of the switching unit is aligned parallel to the carrier surface. The carrier surface can comprise part surfaces that produce a contact in parts with the switching unit. However, a simple construction can be achieved if the carrier—for example in the form of a carrier plate—forms a continuous carrier surface, wherein the switching unit preferably lies completely on the carrier surface.

The switching device comprises in an expedient manner at least two contact connection points by means of which an electrical connection to the supply line and accordingly to the vehicle drive unit can be produced, wherein the switch contacts of the switching unit can be used in an advantageous manner to produce an electrical connection between the contact connection points and accordingly to disconnect said connection. The contact connection points are preferably both provided for conveying the electrical high voltage that is being conveyed by the supply line, wherein a voltage conversion is performed for the purpose of converting the high voltage into a low voltage by means of a voltage conversion unit, for example by means of a transformer or a voltage converter that is a component of the vehicle drive unit.

The term "high voltage" is to be understood to mean in particular an electrical voltage that is provided by a network operator by way of the supply line. The high voltage has in particular a value of at least 500 V. If the electrically driven vehicle is embodied as a rail-borne vehicle, the high voltage can have a value that is typical for a railway system, such as for example 1.5 kV, 3 kV, 15 kV or 25 kV. The high voltage can be a direct current voltage or an alternating current voltage.

The housing unit forms a housing chamber that is encompassed by said housing unit and at least the switching unit and the drive unit are arranged in said housing chamber. The housing unit can comprise by way of example multiple housing parts that are flanged to one another but it is possible to achieve a structurally simple design if the housing unit comprises a housing that forms a continuous housing chamber at least for the switching unit and the drive unit.

In addition, the structurally simple construction can be achieved if the carrier forms a carrier plane, wherein the switching unit and the drive unit are arranged above the carrier plane. It is preferred that the drive unit has a longitudinal direction that is aligned parallel to the carrier plane. The term "above" relates to the perpendicular direction in relation to the carrier plane.

Moreover, it is proposed that the drive unit is arranged—when viewed in a direction that is aligned in a perpendicular manner in relation to the longitudinal direction of the switching unit and parallel to the carrier plane—at least in part at the side adjacent to the switching unit, as a consequence of which a particularly flat construction can be achieved since the drive unit and the switching unit can be arranged in a common plane. The reference to an arrangement of the drive unit being "adjacent" to the switching unit is to be understood to mean in particular an arrangement wherein components of the drive unit are adjacent, preferably directly adjacent, to the switching unit.

It is preferred that the carrier plane is a continuous carrier plane that is provided for supporting the switching unit and the drive unit, as a consequence of which it is possible to omit components and reduce the assembly outlay.

In a preferred embodiment of the invention, it is proposed that the housing unit comprises a carrier plate that forms the carrier plane. The carrier plate can be formed by an assembly plate of the housing plate that is arranged opposite a cover plate in the finished assembled state of the switching device.

If the drive unit is formed in an elongated manner it is possible to achieve an arrangement that reduces the installation space—perpendicular to the longitudinal direction of the switching unit—if the longitudinal direction of the switching unit and the longitudinal direction of the drive unit are aligned parallel to one another.

Moreover, a further reduction in installation space can be achieved if the drive unit and the switching unit are connected by means of a power transmission, wherein a coupling device is provided for coupling the drive unit to the switching unit and said coupling device deflects the power transmission in particular by 180°. The coupling device is arranged in a particularly advantageous manner in the housing unit.

It is preferred that the switching unit, the drive unit and the coupling unit are arranged in a common plane. This arrangement can be achieved by virtue of the fact that the carrier forms a carrier plane, in particular a continuous carrier plane, which supports the switching unit, the drive unit and the coupling device.

In a particularly preferred embodiment of the invention, it is proposed that the housing unit encompasses a housing chamber in which the switching unit and the drive unit are arranged, wherein a part of the housing chamber, which is provided for receiving the arrangement of the switch contacts and the arrangement of components that are electrically connected to said switch contacts, is separated from the remaining part of the housing chamber by means of an electrically insulating shield. As a consequence, it is possible to achieve a particularly small spacing between the switching unit and the components that are adjacent to the switching unit, as a consequence of which it is possible to achieve an advantageous compact arrangement of the components of the switching device within the housing unit. If the switching unit comprises a housing that encompasses a chamber that is provided for the switch contacts, it is proposed in an advantageous embodiment that the housing encompasses the electrically insulating shield. The electrically insulating shield renders it possible for the outwards directed housing surface to have in an advantageous manner an electrical potential that can correspond to the electrical potential of the housing unit, wherein it is possible to omit an air gap between the switching unit and components that directly encompass said air gap.

It is preferred that the switching unit comprises a vacuum switch.

In accordance with a further embodiment of the invention, the switching device comprises an earth disconnector that is arranged in the housing unit. In particular, it is proposed that the switching unit is arranged between the drive unit and the earth disconnector—when viewed in a direction that is aligned in a perpendicular manner in relation to the longitudinal direction of the switching unit and parallel to the carrier plane.

Moreover, an electric vehicle is proposed that comprises a current collector, a vehicle drive unit and a switching device in accordance with the invention that is electrically connected to the current collector and the vehicle drive unit.

In particular, the switching device is fastened to a vehicle roof element, wherein the switching unit and the drive unit of the switching device are arranged lying on a common carrier plane of the carrier and said carrier plane is aligned in a horizontal manner relative to the ground. By virtue of the flat construction that can be achieved by means of the proposed switching device, it is possible to achieve considerable advantages in relation to the aerodynamics in the vehicle roof region. This renders possible a greater degree of flexibility for placing the switching device; the opportunities for placing the switching device are limited in conventional solutions in order to fulfill specific requirements relating to the railway loading gauge. In particular, it is no longer necessary to arrange the switching device in the center.

Moreover, this renders it possible in an advantageous manner to arrange the switching device on the vehicle roof element that is arranged—when viewed in the vertical direction—above a vehicle inner compartment, wherein at least the drive unit is arranged outside the vehicle inner compartment. As a consequence, it is possible in an advantageous manner—in comparison to a solution in which the drive unit is arranged in an aperture cut out of the vehicle roof—to reduce and in particular to prevent an undesired transmission of noise into the vehicle inner compartment during a switching procedure of the switching device. In addition, it is possible to reduce the amount of air gap insulation that normally requires a great deal of space—said air gap insulation conventionally results in a considerable assembly outlay and/or an increased weight and installation height in order to avoid additional components in the ceiling region of the vehicle, such as for example air-conditioning ducts, being impaired. Moreover, it is possible to omit a seal that would be necessary for a conventional roof aperture.

By virtue of arranging the switching unit and the drive unit on a common, horizontal carrier plane, it is possible to fasten the switching device and accordingly its housing unit in a particularly simple manner lying on the vehicle roof elements, wherein the housing unit lies completely on the vehicle roof element.

An exemplary embodiment of the invention is described with reference to the drawings, in which:

DESCRIPTION OF THE INVENTION

Figure 1:
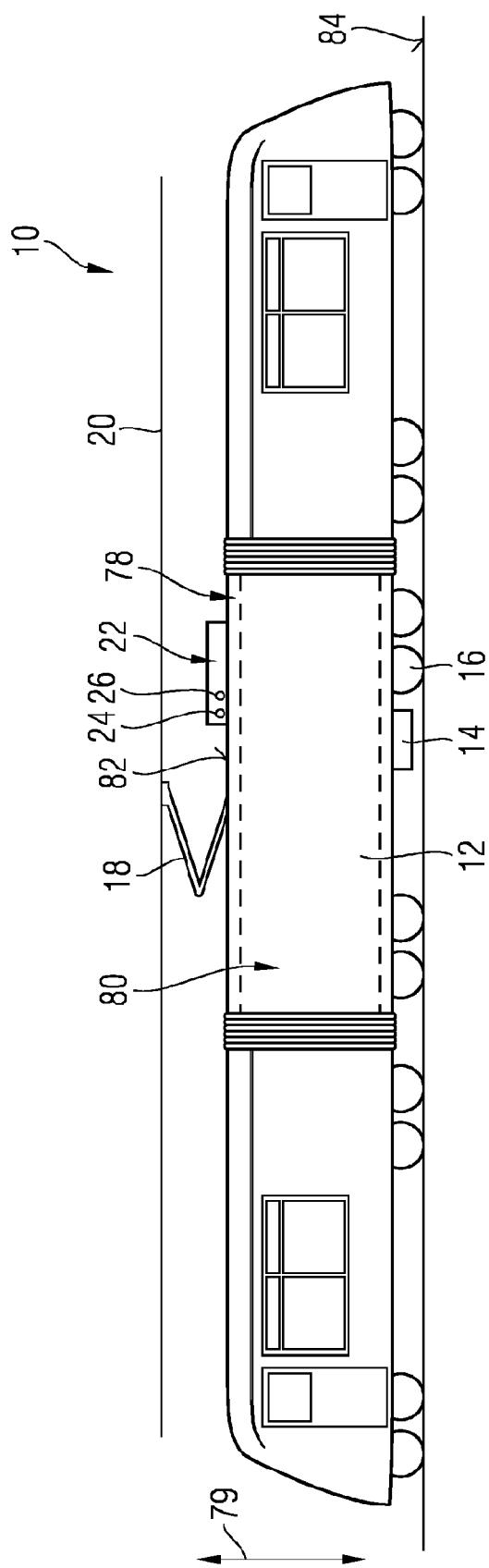
FIG. 1 illustrates a schematic lateral view of a rail-borne vehicle having a current collector, a switching device and a vehicle drive unit.

FIG. 1 illustrates a greatly schematic lateral view of an electrically driven vehicle 10 that is embodied as a rail-borne vehicle. In the exemplary embodiment under consideration, the vehicle 10 is embodied as a traction unit that comprises multiple vehicle units 12. At least one vehicle unit 12 is provided with a vehicle drive unit 14 that is used to drive at least one driving axle 16 of the vehicle 10. The arrangement illustrated in the figure of the at least one driving axle 16 and the vehicle drive unit 14, which is allocated to said driving axle, in the vehicle 10 and the number of the vehicle units 12 are exemplary. The illustration of the vehicle drive unit 14 is likewise greatly schematic, wherein individual components of the vehicle drive unit 14 can be distributed at different sites in the vehicle 10.

In an alternative embodiment, the vehicle 10 can be embodied as an electric locomotive.

In order to supply the vehicle drive unit 14 with electrical energy, the vehicle 10 comprises a current collector 18 that is in electrical contact with an overhead line when the vehicle 10 is in an operating state. The overhead line corresponds in a known manner to an electrical supply line 20 that is conveying high voltage and supplies the vehicle drive unit 14 with electrical energy. As an alternative, the supply line 20 can be embodied as a current rail that extends along a drive track. The high voltage can be embodied as a direct current voltage or as an alternating current voltage and can amount to the conventional values for a railway system of 1.5 kV, 3 kV, 15 kV or 25 kV.

Moreover, the vehicle 10 comprises a switching device 22 that is used for connecting the vehicle drive unit 14—when the current collector 18 is in electrical contact with the supply line 20—to the supply line 20 that is conveying voltage and accordingly to electrically disconnect said vehicle drive unit from this supply line 20. For this purpose, the switching device 22 comprises contact connection points 24, 26 that are electrically connected to the current collector 18 and accordingly to the vehicle drive unit 14. The two contact connection points 24, 26 convey the high voltage that is drawn from the supply line 20. This high voltage is converted into a lower electrical voltage in a voltage conversion unit [not illustrated in detail] of the vehicle drive unit 14.

Figure 2:
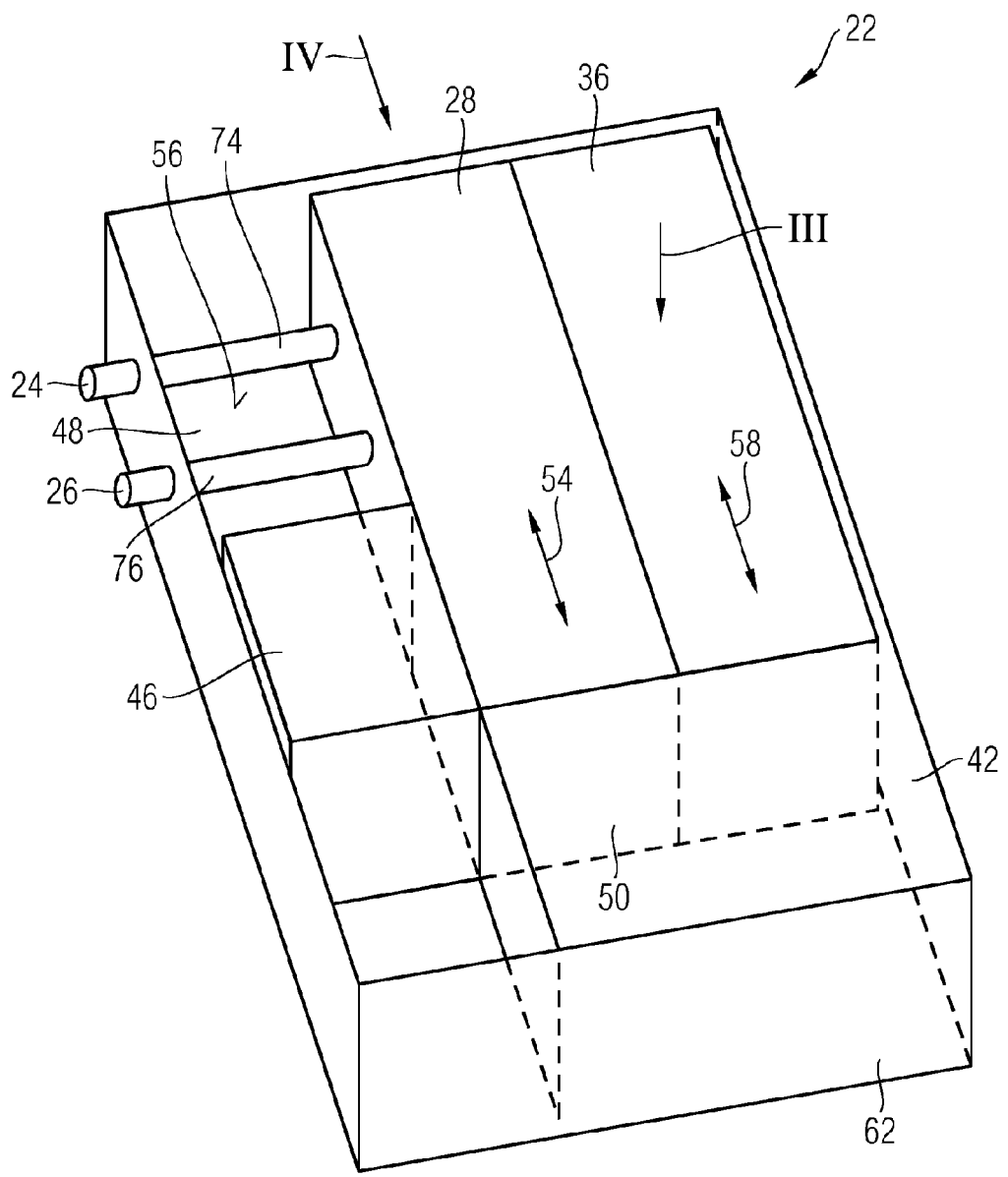
FIG. 2 illustrates a perspective detailed view of the switching device in FIG. 1.
Figure 3:
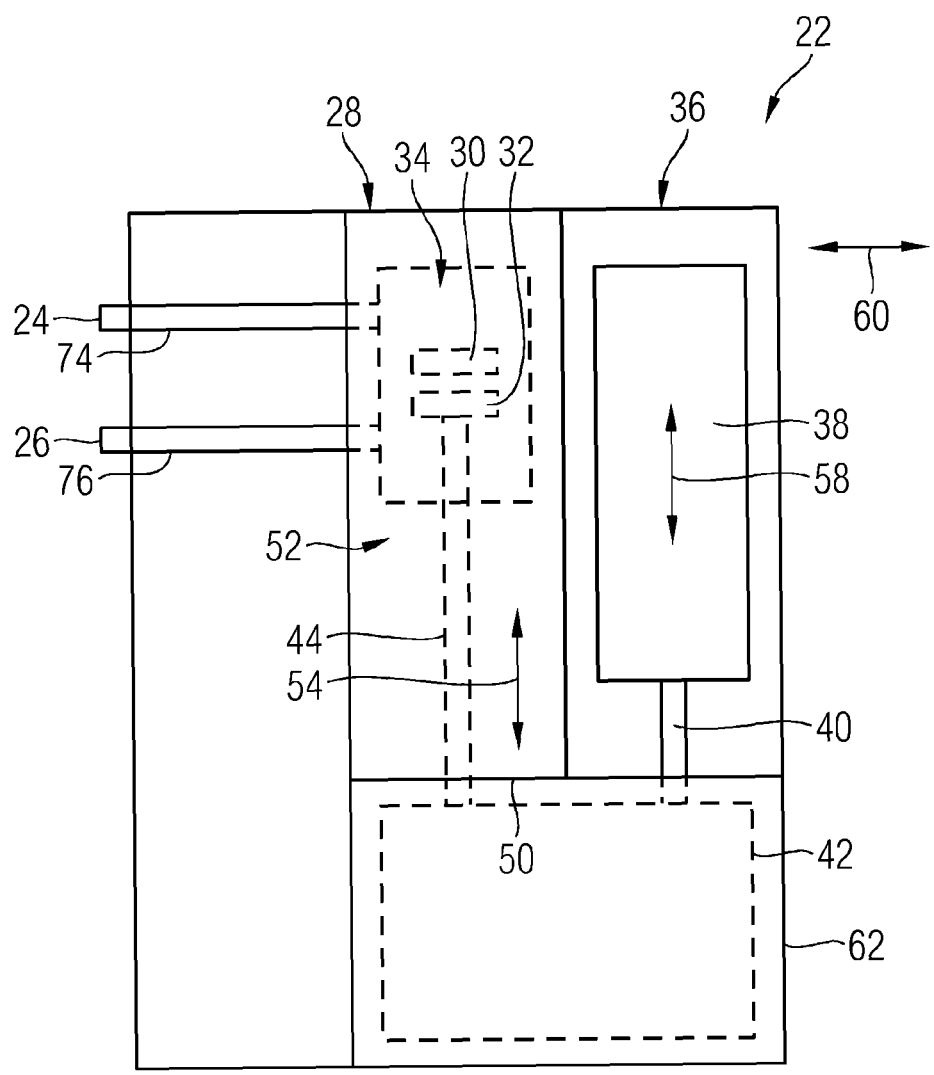
FIG. 3 illustrates a view from above of the switching device in FIG. 2.

The construction of the switching device 22 is described in detail with reference to FIGS. 2 and 3. FIG. 2 illustrates the switching device 22 in a schematic perspective view, whereas FIG. 3 illustrates the arrangement in FIG. 2 in a view from above in accordance with the arrow III in FIG. 2.

The switching device 22 comprises a switching unit 28 that is provided for producing and accordingly disconnecting an electrical connection between the connection points 24, 26 that convey the high voltage. For this purpose, the switching unit 28 comprises two switch contacts 30, 32, wherein the switch contacts 30, 32 can move relative with respect to one another between a disconnected position and a contacted position (FIG. 3). In the exemplary embodiment under consideration, the switch contact 32 can be driven in order to move relative to the switch contact 30, wherein the switch contact 32 can be moved from a disconnected position [illustrated in FIG. 3] into a contacted position in which the switch contact 32 is in contact with the switch contact 30. Each of the switch contacts 30, 32 is electrically connected in each case to a different connection point 24, 26. The switch contacts 30, 32 are arranged in an enclosed chamber 34 in which a vacuum is produced.

In order to drive the relative movement of the switch contacts 30, 32 with respect to one another—in this example in particular in order to drive the switch contact 32—the switching device 22 comprises a drive unit 36 that comprises a driving part 38 and at least one transmission means 40. The transmission means 40 can be actuated in a pneumatic and/or electrical manner by the driving part.

Furthermore, the switching device 22 comprises a coupling unit 42 that is used for coupling the drive unit 36 to the switching unit 28 so that said units are mutually connected by means of a power transmission. The coupling device 42 couples in particular the transmission means 40 of the drive unit 36 in a mechanical manner to a transmission means 44 of the switching unit 28 that is connected in a rigid manner to the switch contact 32 so that a movement of the transmission means 40 causes the transmission means 44 to move. The power transmission is deflected 180° by means of the coupling device 42, wherein the transmission means 40 and 44 move in opposite directions.

As additional components of the switching device 22, FIG. 2 illustrates an earth disconnector 46 that is used for producing and accordingly disconnecting an electrical connection between the switching device 22 and the earth potential.

Figure 4:
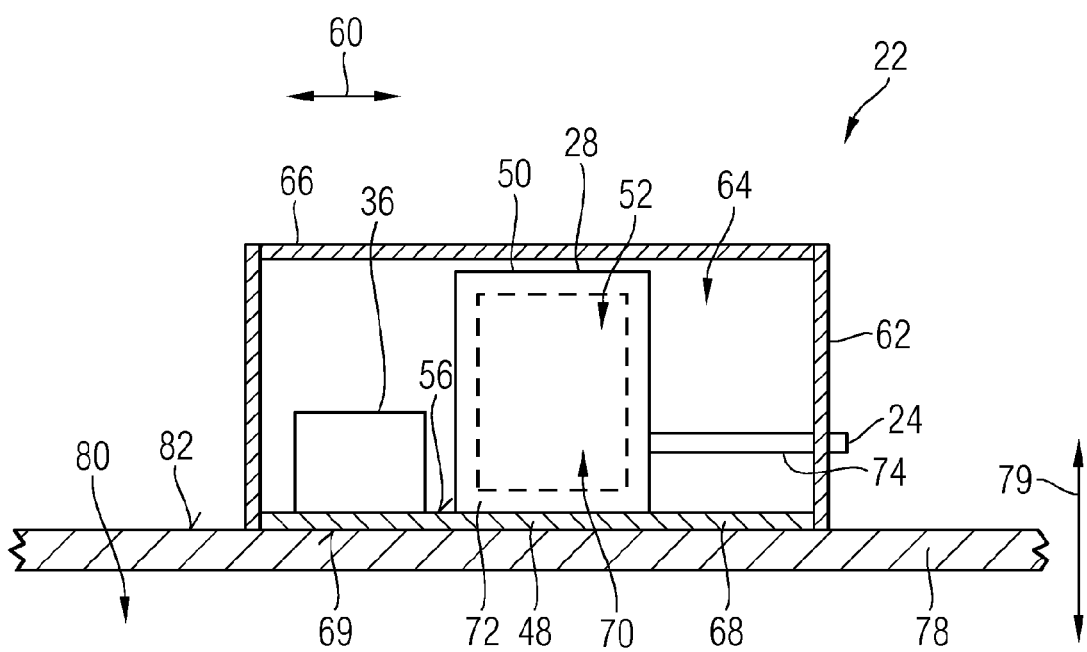
FIG. 4 illustrates a front view of the switching device lying on a vehicle roof element.

The arrangement illustrated in FIGS. 2 and 3 of switching device components is illustrated in FIG. 4 in a front view in accordance with the arrow IV.

The drive unit 36, the switching unit 28 and the connection point 24 are evident in FIG. 4. The switching device 22 comprises a carrier 48 that is used for supporting the switching unit 28. As is also evident from FIGS. 2 and 3, the switching unit 28 comprises a housing 50 that encompasses a chamber 52. This chamber 52 in which are arranged at least the switch contacts 30, 32 is electrically shielded with respect to other components of the switching device 22—such as in particular with respect to the drive unit 36, the coupling unit 42 and the carrier 48. During the operation of the switching device 22, the outwards facing surface of the housing 50 has an electrical potential with respect to the said components and this electrical potential renders it possible to attach the housing 50 to the carrier 48.

As is likewise evident in FIGS. 2 and 3, the switching unit 28 and accordingly its housing 50 has an elongated shape wherein the longitudinal direction 54 of the switching unit 28 is illustrated. In the exemplary embodiment under consideration, the longitudinal direction 54 corresponds to the direction of movement in which the switch contacts 30, 32 move relative to one another between the disconnected position and the contacted position. With regard to the longitudinal direction 54 of the switching unit 28, said switching unit and accordingly its housing 50 is arranged relative to the carrier 48 in a lying position on said carrier.

The carrier 48 is embodied as a carrier plate that forms a carrier plane 56. With regard to the perpendicular direction with respect to the carrier plane 56, the switching unit 28 and the drive unit 36 are arranged above the carrier plane 56. The drive unit 36 extends in a direction and accordingly comprises components [not illustrated in detail] that are arranged in this direction one behind the other, said direction being described as the longitudinal direction 58 of the drive unit 36. The longitudinal direction 58 is aligned parallel to the carrier plane 56 and to the longitudinal direction 54 of the switching unit 28. The drive unit 36 is arranged at the side adjacent to the switching unit 28. The drive components that form the drive unit 36 are to a great extent adjacent to the switching unit 28 and accordingly to its housing 50. When viewed in a direction 60 that is aligned parallel to the carrier plane 56 and perpendicular to the longitudinal direction 54 of the switching unit 28, the drive unit 36 and the switching unit 28 overlap one another.

The carrier plane 56 that is formed by the carrier 48 is a continuous plane and accordingly a continuous carrier surface that is used for attaching the switching unit 28 and the drive unit 36. In other words, the switching unit 28 and the drive unit 36 that is allocated to said switching unit are mounted on the common carrier 48 and accordingly on the common carrier plane 56. In addition, the carrier 48 and accordingly the carrier plane 56 are used for assembling the coupling device 42 and the earth disconnector 46. As a consequence, an arrangement is achieved in which at least the drive unit 36 and the switching unit 28 are arranged in a plane. In addition, the coupling device 42 and the earth disconnector 46 are likewise arranged in this plane, as a consequence of which a particularly flat construction can be achieved.

As is further evident from FIGS. 2 and 3, the switching device 22 comprises a housing unit 62 that is used for receiving at least the switching unit 28 and the drive unit 36. In particular, the housing unit 62 encompasses a housing chamber 64 in which the switching unit 28 and the drive unit 36 are arranged. In the exemplary embodiment under consideration, the housing chamber 64 is continuous. In addition to the switching unit 28 and the drive unit 36, the coupling device 42 and the earth disconnector 46 are arranged in the housing chamber 64. FIGS. 2 and 3 illustrate the switching device 22, wherein a cover part 66 of the housing unit 62 (cf. FIG. 4) is not illustrated for the sake of clarity.

The housing unit 62 comprises a base part that is arranged opposite the cover part 66 and is embodied in the form of a carrier plate 68 and corresponds to the carrier 48. The carrier plate 68 therefore forms the carrier plane 56. The carrier plate 68 forms a housing outer surface 69 that is aligned parallel to the carrier plane 56.

The chamber 52 that—as described above—is encompassed by the housing 50 corresponds to a part 70 of the housing chamber 64 that is provided for the switch contacts 30, 32 and for the components that are electrically connected to said switch contacts. The chamber 52 or rather the part 70 of the housing chamber 64 is separated from the remaining part of the housing chamber 64 by means of an electrically insulating shield 72. This part 70 is connected to the connection points 24, 26 by means of electrical connections 74, 76 that are likewise electrically shielded with respect to their immediate environment.

The switching unit 28 is arranged in the center in the housing chamber 64 in relation to the direction 60 and accordingly the width of the housing unit 62. Said switching unit is arranged between the drive unit 36 and the earth disconnector 46 when viewed in the direction 60.

Moreover, FIG. 4 illustrates a vehicle roof element 78 that covers a vehicle inner compartment 80 (cf. also FIG. 1). In relation to the vertical direction 79, the vehicle roof element 78 is arranged above the vehicle inner chamber 80. The vehicle roof element 78 forms an upwards facing outer surface of the vehicle 10. The switching device 22 is fastened to the vehicle roof element 78 and in fact is lying on the outer surface of said vehicle roof element. The longitudinal direction of the switching device 22 and accordingly the longitudinal direction of the housing unit 62 that corresponds to the longitudinal direction 54 of the switching unit 28 are aligned parallel to a roof plane 82 that is formed by the vehicle roof element 78. The carrier plane 56 of the carrier 48 that is provided for the switching unit 28 and the drive unit 36 is consequently aligned parallel to the roof plane 82 and to the ground 84 and therefore in a horizontal manner. The housing outer surface 69 lies against the roof plane 82. Both the switching unit 28 and also the drive unit 36 of the switching device 22 are arranged outside the vehicle inner chamber 80.

The switching device 22 together with its housing unit 62 and its components that are arranged in the housing chamber 64 is pre-manufactured as a structural assembly prior to being mounted on or in the vehicle 10. Once said structural assembly is mounted on or in the said vehicle, the connection points 24, 26 that protrude out of the housing chamber 64 are connected to the current collector and to the vehicle drive unit 14 respectively.

The switching position of the earth disconnector 46 can be indicated by means of a mechanically actuated display unit so that this switching position can be viewed from outside. For example, it is possible to use a rod that pushes from the inside against a bellows and as a consequence indicates the switching position to the outside without having to open the housing unit.

It is possible by means of the earth disconnector 46 to connect the housing unit 62 to the earth potential so that conventional roof railings or high voltage frames that would otherwise be required to provide protection against accidental contact can be omitted.

The switching device 22 can be mounted on further installation sites in the vehicle 10, such as for example in roof rounding's, in the lower floor region or in an instrument chamber.

The invention claimed is:

1. A switching device for an electrically driven vehicle, the switching device comprising:
    a switching unit for connecting and disconnecting a vehicle drive unit to and accordingly from an electrical supply line conveying a high voltage, said switching unit having at least two switch contacts;
    a drive unit for driving a relative movement of said switch contacts with respect to one another;
    a housing unit for receiving said switching unit and said drive unit, said housing unit having a carrier for supporting at least said switching unit, said switching unit disposed relative to said carrier in a lying position on said carrier; and
    an earth disconnector disposed in said housing unit.

2. The switching device according to claim 1, wherein:
    said carrier forms a carrier plane; and
    said switching unit and said drive unit are disposed above said carrier plane.

3. The switching device according to claim 2, wherein said drive unit when viewed in a direction that is aligned perpendicularly to a longitudinal direction of said switching unit and parallel to said carrier plane is disposed at least in part at a side adjacent to said switching unit.

4. The switching device according to claim 3, further comprising an earth disconnector disposed in said housing unit, and said switching unit when viewed in the direction that is aligned perpendicularly to the longitudinal direction of said switching unit and parallel to said carrier plane is disposed between said drive unit and said earth disconnector.

5. The switching device according to claim 2, wherein said carrier plane is a continuous carrier plane that is provided for supporting said switching unit and said drive unit.

6. The switching device according to claim 2, wherein said carrier of said housing unit is a carrier plate that forms said carrier plane.

7. The switching device according to claim 1, wherein said drive unit is formed in an elongated manner, wherein a longitudinal direction of said switching unit and a longitudinal direction of said drive unit are aligned parallel to one another.

8. The switching device according to claim 1, wherein said switching unit has a vacuum switch.

9. The switching device according to claim 1, wherein the electrically driven vehicle is a rail-borne vehicle.

10. A switching device for an electrically driven vehicle, the switching device comprising:
    a switching unit for connecting and disconnecting a vehicle drive unit to and accordingly from an electrical supply line conveying a high voltage, said switching unit having at least two switch contacts;
    a drive unit for driving a relative movement of said switch contacts with respect to one another;

a housing unit for receiving said switching unit and said drive unit, said housing unit having a carrier for supporting at least said switching unit, said switching unit disposed relative to said carrier in a lying position on said carrier;

said drive unit and said switching unit are connected by means of a power transmission; and a coupling device coupling said drive unit to said switching unit, said coupling device causing a deflection of the power transmission in particular by 180°.

11. A switching device for an electrically driven vehicle, the switching device comprising:

a switching unit for connecting and disconnecting a vehicle drive unit to and accordingly from an electrical supply line conveying a high voltage, said switching unit having at least two switch contacts;

a drive unit for driving a relative movement of said switch contacts with respect to one another;

a housing unit for receiving said switching unit and said drive unit, said housing unit having a carrier for supporting at least said switching unit, said switching unit disposed relative to said carrier in a lying position on said carrier, said housing unit having an electrically insulating shield and encompasses a housing chamber in which said switching unit and said drive unit are disposed, said housing chamber having a part provided for an arrangement of said switch contacts and an arrangement of components that are electrically connected to said switch contacts is separated from a remaining part of said housing chamber by means of said electrically insulating shield.

12. An electric vehicle, comprising:

a current collector;

a vehicle drive unit; and a switching device electrically connected to said current collector and said vehicle drive unit, said switching device containing:

a switching unit for connecting and disconnecting said vehicle drive unit to and accordingly from an electrical supply line conveying a high voltage, said switching unit having at least two switch contacts;

a drive unit for driving a relative movement of said switch contacts with respect to one another;

a housing unit for receiving said switching unit and said drive unit, said housing unit having a carrier for supporting at least said switching unit, said switching unit disposed relative to said carrier in a lying position on said carrier; and an earth disconnector disposed in said housing unit.

13. The electric vehicle according to claim 12, further comprising a vehicle roof element, said switching device is fastened to said vehicle roof element; and wherein said carrier has a common carrier plane, said switching unit and said drive unit of said switching device are disposed in a lying manner on said common carrier plane and said common carrier plane is disposed in a horizontal manner relative to ground.

14. The electric vehicle according to claim 13, further comprising a vehicle inner compartment, said vehicle roof element is disposed above said vehicle inner compartment and said switching device is fastened to said vehicle roof element in such a manner that at least said drive unit is disposed outside said vehicle inner compartment.

15. The electric vehicle according to claim 14, wherein said switching device is fastened in a lying position on said vehicle roof element.

16. The electric vehicle according to claim 12, wherein the electrical vehicle is an electrically driven rail-borne vehicle.

17. An electric vehicle, comprising:

a current collector;

a vehicle drive unit; and a switching device electrically connected to said current collector and said vehicle drive unit, said switching device containing:

a switching unit for connecting and disconnecting said vehicle drive unit to and accordingly from an electrical supply line conveying a high voltage, said switching unit having at least two switch contacts;

a drive unit for driving a relative movement of said switch contacts with respect to one another;

a housing unit for receiving said switching unit and said drive unit, said housing unit having a carrier for supporting at least said switching unit, said switching unit disposed relative to said carrier in a lying position on said carrier;

said drive unit and said switching unit are connected by means of a power transmission; and a coupling device coupling said drive unit to said switching unit, said coupling device causing a deflection of the power transmission in particular by 180°.

18. An electric vehicle, comprising:

a current collector;

a vehicle drive unit; and a switching device electrically connected to said current collector and said vehicle drive unit, said switching device containing:

a switching unit for connecting and disconnecting said vehicle drive unit to and accordingly from an electrical supply line conveying a high voltage, said switching unit having at least two switch contacts;

a drive unit for driving a relative movement of said switch contacts with respect to one another;

a housing unit for receiving said switching unit and said drive unit, said housing unit having a carrier for supporting at least said switching unit, said switching unit disposed relative to said carrier in a lying position on said carrier, said housing unit having an electrically insulating shield and encompasses a housing chamber in which said switching unit and said drive unit are disposed, said housing chamber having a part provided for an arrangement of said switch contacts and an arrangement of components that are electrically connected to said switch contacts is separated from a remaining part of said housing chamber by means of said electrically insulating shield.

* * * * *